(12) United States Patent
Park

(10) Patent No.: US 11,384,817 B2
(45) Date of Patent: Jul. 12, 2022

(54) POWERTRAIN FOR ELECTRIC VEHICLE

(71) Applicants: Hyundai Motor Company, Seoul (KR); Kia Motors Corporation, Seoul (KR)

(72) Inventor: Jong Yun Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/010,251

(22) Filed: Sep. 2, 2020

(65) Prior Publication Data

US 2021/0364064 A1   Nov. 25, 2021

(30) Foreign Application Priority Data

May 25, 2020   (KR) .......................... 10-2020-0062667

(51) Int. Cl.
*B60K 1/00*   (2006.01)
*F16H 3/089*   (2006.01)
(Continued)

(52) U.S. Cl.
CPC ............... *F16H 3/089* (2013.01); *B60K 1/00* (2013.01); *B60K 17/02* (2013.01); *B60K 17/16* (2013.01);
(Continued)

(58) Field of Classification Search
CPC .......... F16H 3/089; F16H 3/10; F16H 37/046; F16H 3/006; F16H 2702/04; F16H 2200/0021; F16H 2200/0034; F16H 3/54; F16H 61/02; F16H 2200/0086; F16H 2057/049; F16H 37/042; F16D 41/00;
(Continued)

(56) References Cited

U.S. PATENT DOCUMENTS 9,644,709 B2 *    5/2017   Venturi ................... B60K 6/387
10,948,049 B2 *   3/2021   Yang ....................... F16H 3/089
(Continued)

FOREIGN PATENT DOCUMENTS

DE   4212324 A1   8/1992
EP   2305501 B2   1/2012
(Continued)

*Primary Examiner* — David J Hlavka
(74) *Attorney, Agent, or Firm* — Morgan, Lewis & Bockius LLP

(57) ABSTRACT

A power train for an electric vehicle may include an input shaft to which a motor is fixedly connected; an output shaft mounted in parallel to the input shaft; a first driving gear and a first driven gear mounted on the input shaft and the output shaft, respectively, to be gear-engaged with each other; a second driving gear and a second driven gear mounted on the input shaft and the output shaft, respectively, to be gear-engaged with each other; a one-way clutch mounted in a first path where power is transmitted from the input shaft to the output shaft through the first driving gear and the first driven gear; a restraining mechanism mounted to selectively restrain the one-way clutch from freely rotating; and a friction clutch mounted to regulate a second path where power is transmitted from the input shaft to the output shaft through the second driving gear and the second driven gear.

8 Claims, 8 Drawing Sheets

(51) Int. Cl.
*B60K 17/02* (2006.01)
*B60K 17/16* (2006.01)
*F16D 41/00* (2006.01)
*F16D 47/04* (2006.01)
*F16D 11/14* (2006.01)
*F16H 37/04* (2006.01)
*F16H 3/10* (2006.01)
*F16H 3/00* (2006.01)

(52) U.S. Cl.
CPC ............. *F16D 11/14* (2013.01); *F16D 41/00* (2013.01); *F16D 47/04* (2013.01); *F16H 3/006* (2013.01); *F16H 3/10* (2013.01); *F16H 37/046* (2013.01); *B60K 2001/001* (2013.01); *F16H 2003/007* (2013.01); *F16H 2200/0021* (2013.01); *F16H 2200/0034* (2013.01); *F16H 2702/04* (2013.01)

(58) Field of Classification Search
CPC .......... F16D 47/04; F16D 11/14; F16D 21/00; F16D 13/00; F16D 11/00; B60K 17/16; B60K 1/00; B60K 17/02; B60K 17/08; B60K 2001/001
See application file for complete search history.

(56) References Cited

U.S. PATENT DOCUMENTS

| | | | |
|---|---|---|---|
| 2014/0033844 A1* | 2/2014 | Rothvoss | F16H 3/16 74/335 |
| 2016/0003326 A1* | 1/2016 | Park | F16H 3/089 74/664 |
| 2016/0003351 A1* | 1/2016 | Park | F16H 3/54 475/153 |
| 2018/0126639 A1* | 5/2018 | Tyler | B29C 64/227 |
| 2018/0335110 A1* | 11/2018 | Yang | F16D 41/064 |
| 2019/0344656 A1* | 11/2019 | Obergasser | B60K 6/387 |
| 2020/0003279 A1* | 1/2020 | Hara | B60K 17/02 |

FOREIGN PATENT DOCUMENTS

| | | |
|---|---|---|
| EP | 2696104 A2 | 2/2014 |
| KR | 2012-0005101 A | 1/2012 |

* cited by examiner

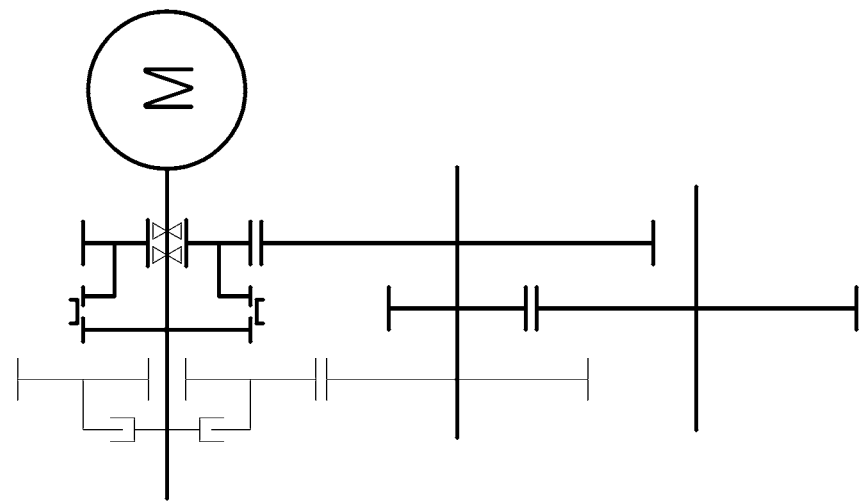
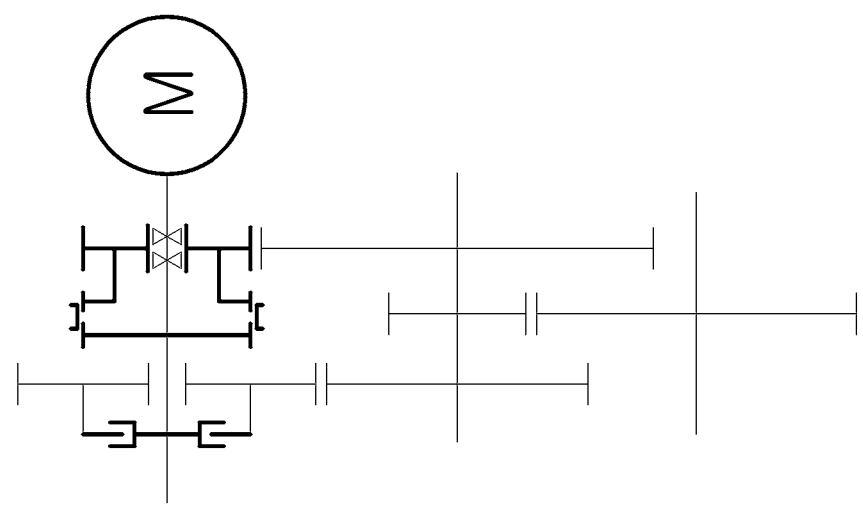
FIG. 8

POWERTRAIN FOR ELECTRIC VEHICLE

CROSS REFERENCE TO RELATED APPLICATION

The present application claims priority to Korean Patent Application No. 10-2020-0062667, filed May 25, 2020, the entire contents of which is incorporated herein for all purposes by this reference.

BACKGROUND OF THE PRESENT INVENTION

Field of the Invention

The present invention relates to a power train for an electric vehicle, and more particularly, to a structure of the power train in which power of a motor may be transmitted to a driving wheel after gear shifting.

Description of Related Art

In an electric vehicle, a rotational force generated from an electric motor (hereinafter referred to as "the motor") is transmitted to a driving wheel to drive the vehicle.

The related art mainly utilizes a power transmission structure in which power generated from the motor is transmitted to the driving wheel after being decelerated by a simple decelerator. Recently, efforts have been made to transmit power from the motor to the driving wheel in a more efficient way, extending an allowable mileage of the vehicle and improving driving performance.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a power train for an electric vehicle configured for providing two gear-shift ratios while having a relatively simple configuration, reducing a volume of a motor used and a weight of the vehicle depending thereon, changing an operating point of the motor, and entering a neutral state in which the motor is disconnected from a driving wheel, so that fuel efficiency of the vehicle may be improved.

According to various exemplary embodiments of the present invention, a power train for an electric vehicle includes: an input shaft to which a motor is fixedly connected; an output shaft mounted in parallel to the input shaft; a first driving gear and a first driven gear mounted on the input shaft and the output shaft, respectively, to be gear-engaged with each other; a second driving gear and a second driven gear mounted on the input shaft and the output shaft, respectively, to be gear-engaged with each other; a one-way clutch mounted in a first path where power is transmitted from the input shaft to the output shaft through the first driving gear and the first driven gear; a restraining mechanism mounted to selectively restrain the one-way clutch from freely rotating; and a friction clutch mounted to regulate a second path where power is transmitted from the input shaft to the output shaft through the second driving gear and the second driven gear.

The restraining mechanism may include a dog clutch provided to switch between a free rotation-restrained state and a free rotation-released state of the one-way clutch by linear movement of a sleeve along an axial direction of the input shaft or the output shaft.

The first driving gear may be rotatably mounted on the input shaft; and the one-way clutch may be mounted between the first driving gear and the input shaft to transmit power from the input shaft toward the first driving gear.

The second driving gear may be rotatably mounted on the input shaft; and the friction clutch may be mounted for regulating the second driving gear and the input shaft.

The second driven gear may be rotatably mounted on the output shaft; and the friction clutch may be mounted for regulation between the second driven gear and the output shaft.

The first driven gear may be rotatably mounted on the output shaft; and the one-way clutch may be mounted between the first driven gear and the output shaft to transmit power from the first driven gear to the output shaft.

The second driving gear may be rotatably mounted on the input shaft; and the friction clutch may be mounted for regulating the second driving gear and the input shaft.

The second driven gear may be rotatably mounted on the output shaft; and the friction clutch may be mounted for regulation between the second driven gear and the output shaft.

The output shaft may include an output gear; and the output gear may be mounted to output power to a ring gear of differential gearing.

The friction clutch may be a normally-closed type friction clutch that transmits power in a closed state unless a separate operating force is applied thereto.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a view exemplarily illustrating that a parking function is implemented in the various exemplary embodiments.

Figure 1:
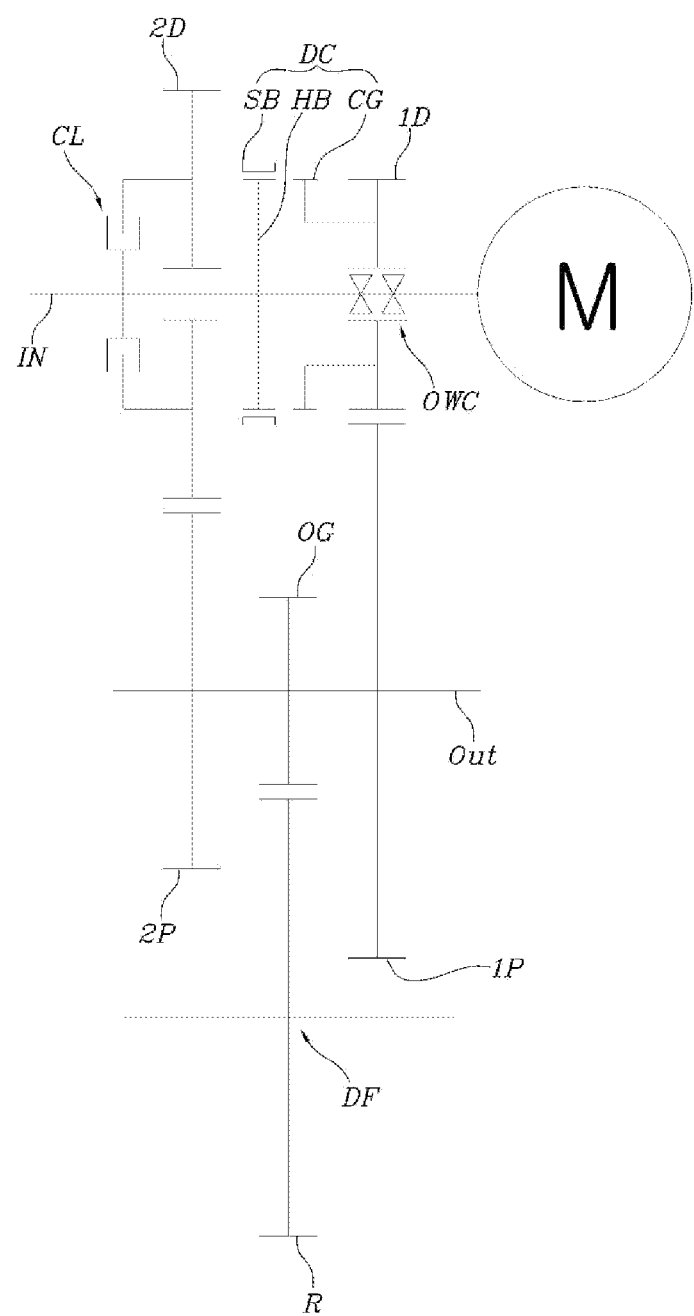
FIG. 1 is a schematic diagram illustrating various exemplary embodiments of a power train for an electric vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, FIG. 2, FIG. 3, and FIG. 4, various exemplary embodiments of power trains for electric vehicles according to various exemplary embodiments of the present invention share in common: an input shaft IN to which a motor M is connected; an output shaft OUT mounted in parallel to the input shaft IN; a first driving gear 1D and a first driven gear 1P mounted on the input shaft IN and the output shaft OUT, respectively, to be gear-engaged with each other; a second driving gear 2D and a second driven gear 2P mounted on the input shaft IN and the output shaft OUT, respectively, to be gear-engaged with each other; a one-way clutch OWC mounted in a path where power is transmitted from the input shaft IN to the output shaft OUT through the first driving gear 1D and the first driven gear 1P; a restraining mechanism mounted to selectively restrain the one-way clutch OWC from freely rotating; and a friction clutch CL mounted to regulate a path where power is transmitted from the input shaft IN to the output shaft OUT through the second driving gear 2D and the second driven gear 2P.

That is, the present invention includes two power transmission paths in total: one power transmission path in which the power transmitted from the motor M to the input shaft IN is transmitted to the output shaft OUT through the first driving gear 1D and the first driven gear 1P; and the other power transmission path in which the power transmitted from the motor M to the input shaft IN is transmitted to the output shaft OUT through the second driving gear 2D and the second driven gear 2P. The path through the first driving gear 1D and the first driven gear 1P may be regulated by the one-way clutch OWC and the restraining mechanism configured for restraining the one-way clutch OWC from freely rotating, and the path through the second driving gear 2D and the second driven gear 2P may be regulated by the friction clutch CL.

Of course, a gear ratio formed by the first driving gear 1D and the first driven gear 1P is greater than that formed by the second driving gear 2D and the second driven gear 2P. Thus, the first driving gear 1D and the first driven gear 1P implement a first gear shifting, which is a lower-level gear shifting, and the second driving gear 2D and the second driven gear 2P implement a second gear shifting, which is a higher-level gear shifting.

The one-way clutch OWC may rotate freely to transmit power in either direction thereof, while not transmitting power in the opposite direction thereof, and any of the various conventional types such as a roller type or a sprag type may be used thereto.

The restraining mechanism includes a dog clutch DC mounted to switch between a free rotation-restrained state and a free rotation-released state of the one-way clutch OWC by linear movement of a sleeve SB along an axial direction of the input shaft IN or the output shaft OUT.

The output shaft OUT includes an output gear OG, and the output gear OG is mounted to output power to a ring gear R of differential gearing DF.

Meanwhile, the friction clutch CL is a normally-closed type friction clutch that transmits power in a closed state unless a separate operating force is applied thereto, implementing a parking function without having a separate parking mechanism as will be described below.

The above-described configuration is common to all of the first to various exemplary embodiments.

Figure 2:
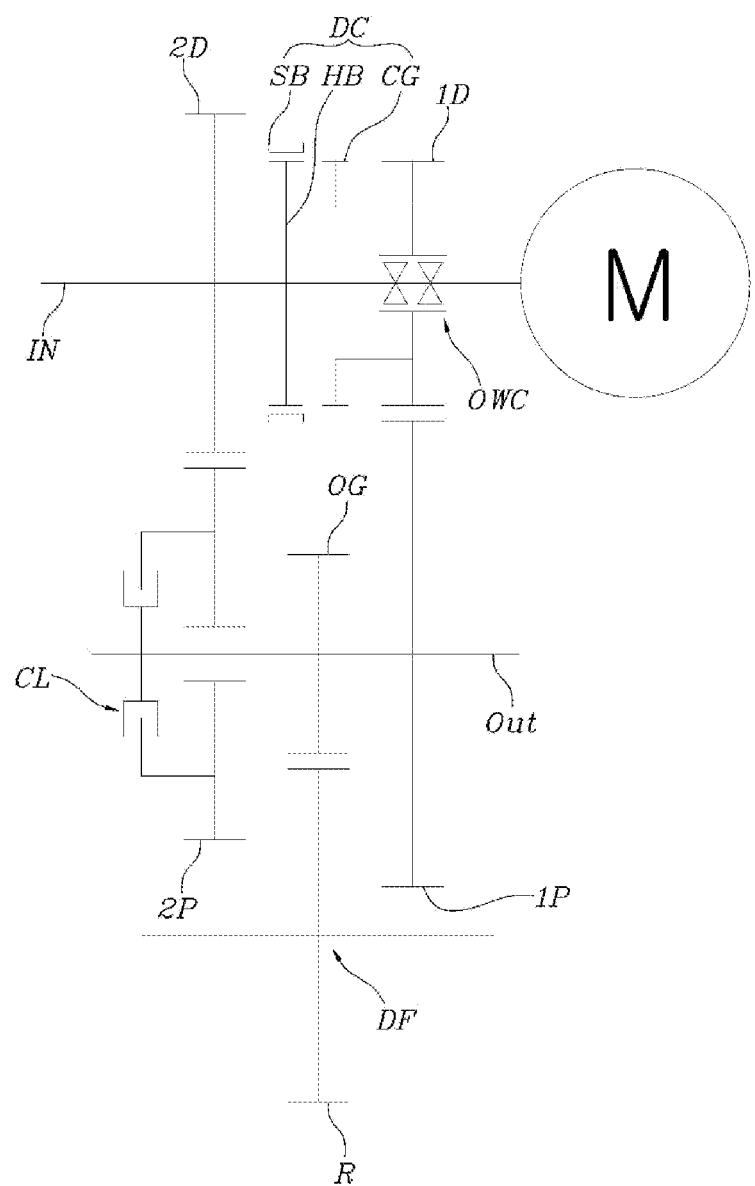
FIG. 2 is a schematic diagram illustrating various exemplary embodiments of a power train for an electric vehicle according to various exemplary embodiments of the present invention.

The various exemplary embodiments of FIG. 1 and FIG. 2 share in common: the first driving gear 1D is rotatably mounted on the input shaft IN; and the one-way clutch OWC is mounted between the first driving gear 1D and the input shaft IN to transmit power from the input shaft IN toward the first driving gear 1D.

That is, in the one-way clutch OWC, an internal race is fixed to the input shaft IN, and an external race is fixed to the first driving gear 1D.

Accordingly, in a situation where the input shaft IN rotates faster than the first driving gear 1D, the input shaft IN and the first driving gear 1D rotate together while power is transmitted from the input shaft IN toward the first driving gear 1D. However, in a situation where the first driving gear 1D is driven faster than the input shaft IN, the first driving gear 1D may rotate faster than the input shaft IN, because the first driving gear 1D and the input shaft IN are not bound to each other due to the free rotation of the one-way clutch OWC.

Here, in the dog clutch DC, a hub HB is mounted on the input shaft IN, a clutch gear CG is integrally provided on the first driving gear 1D, and the sleeve SB, which is configured to be slidable linearly along the axial direction on the hub HB, moves along the axial direction of the input shaft IN to shift between the free rotation-restrained state of the one-way clutch OWC while the first driving gear 1D is fixed to the input shaft IN and the free rotation-released state of the one-way clutch OWC.

In the various exemplary embodiments of FIG. 1, the second driving gear 2D is rotatably mounted on the input shaft IN, and the friction clutch CL is mounted for regulation between the second driving gear 2D and the input shaft IN.

Of course, the second driven gear 2P is mounted on the output shaft OUT in a rotation-restrained state.

Therefore, the power transmission path through the second driving gear 2D and the second driven gear 2P is connected or disconnected by the friction clutch CL.

In contrast, in the various exemplary embodiments of FIG. 2, the second driven gear 2P is rotatably mounted on the output shaft OUT, and the friction clutch CL is mounted for regulation between the second driven gear 2P and the output shaft OUT.

Figure 3:
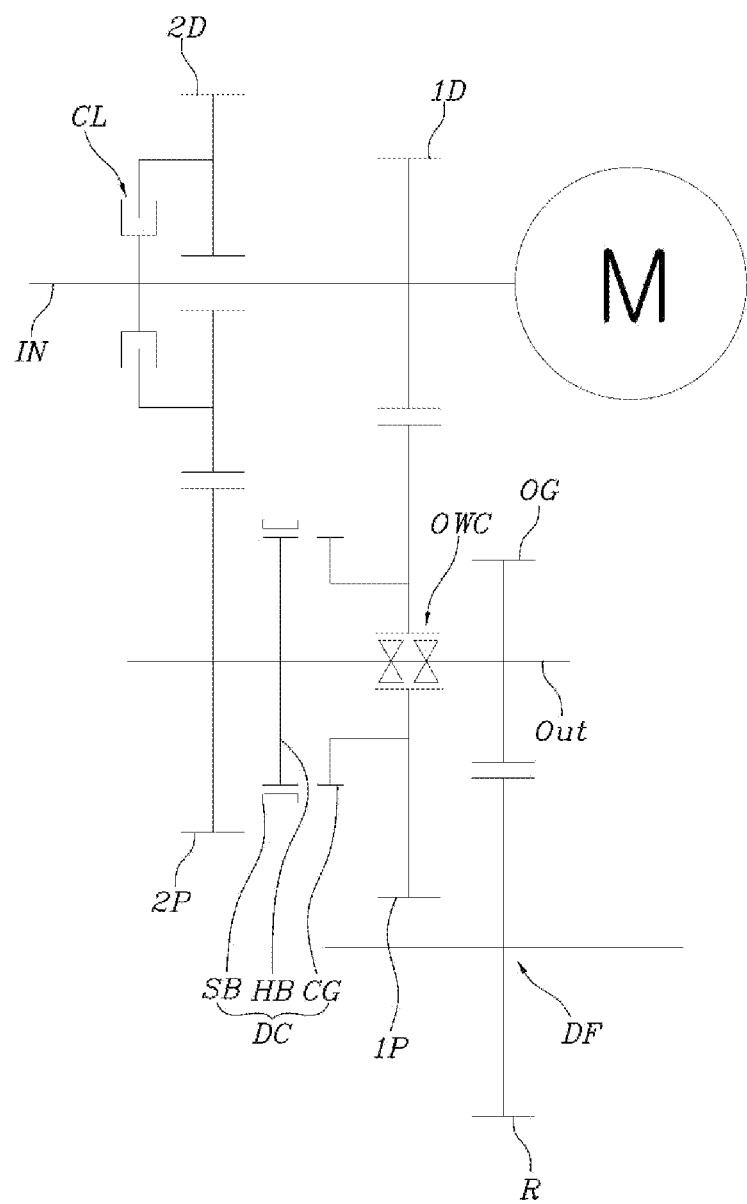
FIG. 3 is a schematic diagram illustrating various exemplary embodiments of a power train for an electric vehicle according to various exemplary embodiments of the present invention.
Figure 4:
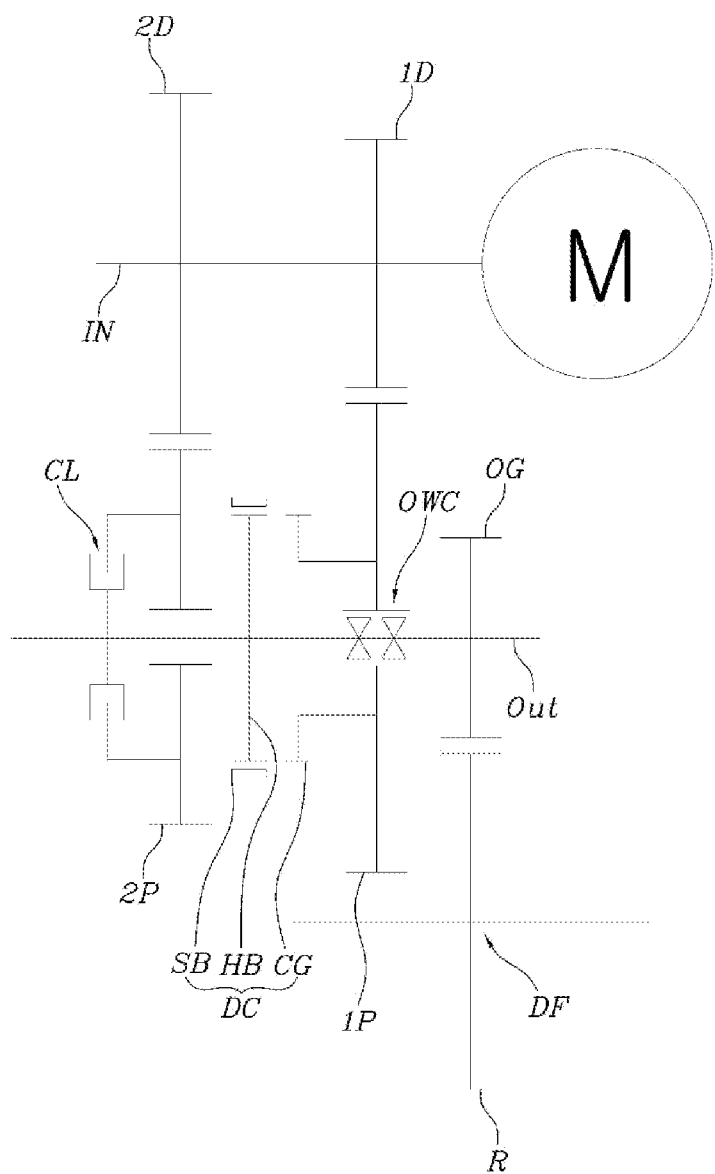
FIG. 4 is a schematic diagram illustrating various exemplary embodiments of a power train for an electric vehicle according to various exemplary embodiments of the present invention.

Meanwhile, in the third and various exemplary embodiments of FIG. 3 and FIG. 4, the first driving gear 1D is fixed to the input shaft IN, the first driven gear 1P is rotatably mounted on the output shaft OUT, and the one-way clutch OWC is mounted between the first driven gear 1P and the output shaft OUT to transmit power from the first driven gear 1P toward the output shaft OUT.

That is, in the one-way clutch OWC, the internal race is fixed to the output shaft OUT and the external race is fixed to the first driven gear 1P.

In the present structure, the one-way clutch OWC is in a freely rotating state where the power is transmitted only in a direction in which the first driven gear 1P drives the output shaft OUT, and the power is not transmitted in the opposite direction thereof.

Furthermore, the dog clutch DC is configured such that the hub HB is mounted on the output shaft OUT, and the clutch gear CG is integrated with the first driven gear 1P.

In the various exemplary embodiments of FIG. 3, the second driving gear 2D is rotatably mounted on the input shaft IN, and the friction clutch CL is mounted for regulation between the second driving gear 2D and the input shaft IN.

In the various exemplary embodiments of FIG. 4, the second driven gear 2P is rotatably mounted on the output shaft OUT, and the friction clutch CL is mounted for regulation between the second driven gear 2P and the output shaft OUT.

Hereinafter, a gear shifting process will be described through the various exemplary embodiments.

Figure 5:
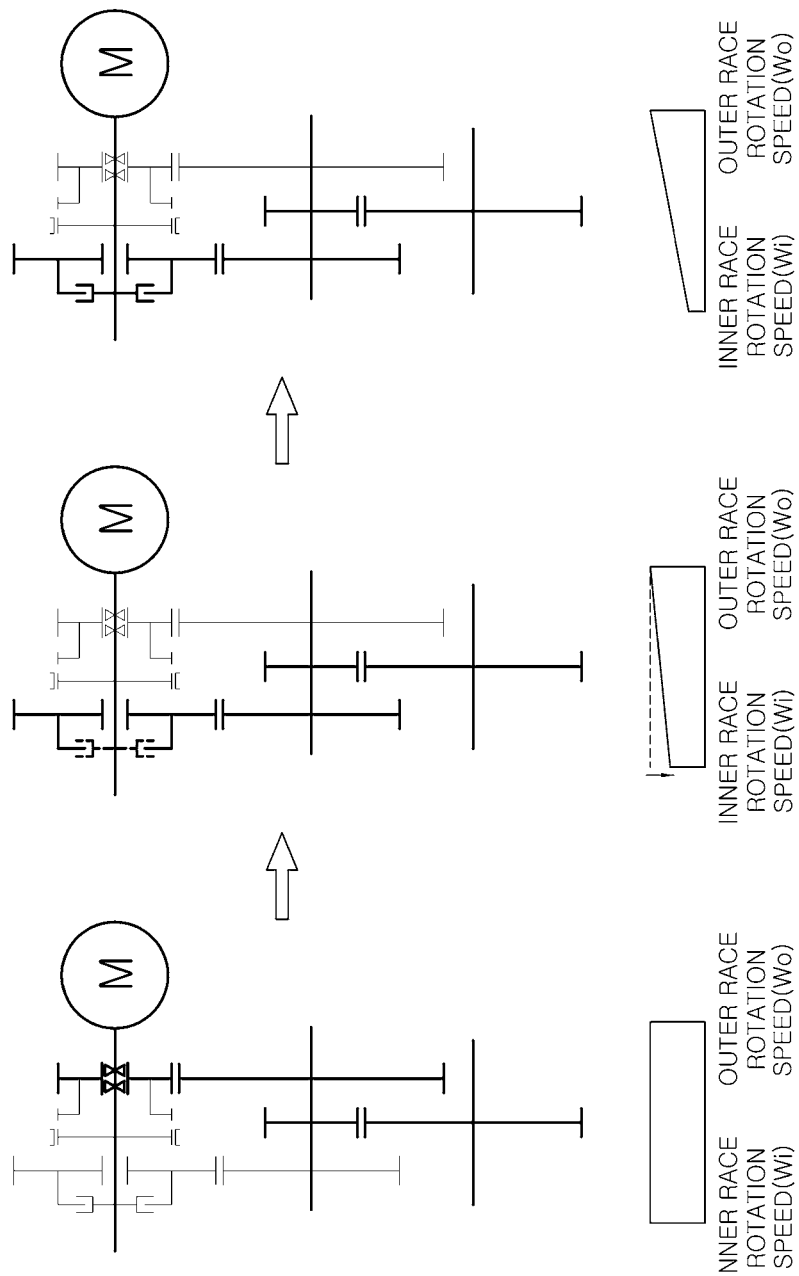
FIG. 5 is a view exemplarily illustrating a process in which the power train of the various exemplary embodiments shifts from a first gear to a second gear.

FIG. 5 illustrates a process of shifting from a first gear to a second gear step by step. In a first-gear state as illustrated in the left of FIG. 5, the power of the motor M is transmitted from the input shaft IN to the first driving gear 1D through the one-way clutch OWC, the power transmitted to the first driving gear 1D is transmitted to the output shaft OUT after gear shifting at a first gear-shift ratio while passing through the first driven gear 1P, and sequentially, the power transmitted to the output shaft OUT is output through the output gear OG and differential gearing DF.

In the above-described state, the internal and external races of the one-way clutch OWC have the same speed as illustrated in a diagram enclosed in a lower portion of FIG. 5.

Shifting from the above-described state to the second gear is initiated by gradually increasing a frictional force of the friction clutch CL.

That is, when the frictional force of the friction clutch CL increases as illustrated in the center portion of FIG. 5, a speed of the input shaft IN and the motor M to which the internal race is fixed decreases. When the friction clutch CL is completely engaged, the speed of the input shaft IN and the motor M decreases to correspond to a second gear ratio as illustrated in the right of FIG. 5, completing shifting to the second gear.

That is, at the time of shifting from the first gear to the second gear, the frictional force of the friction clutch CL continuously increases, resulting in smooth gear shifting without torque interruption.

Figure 6:
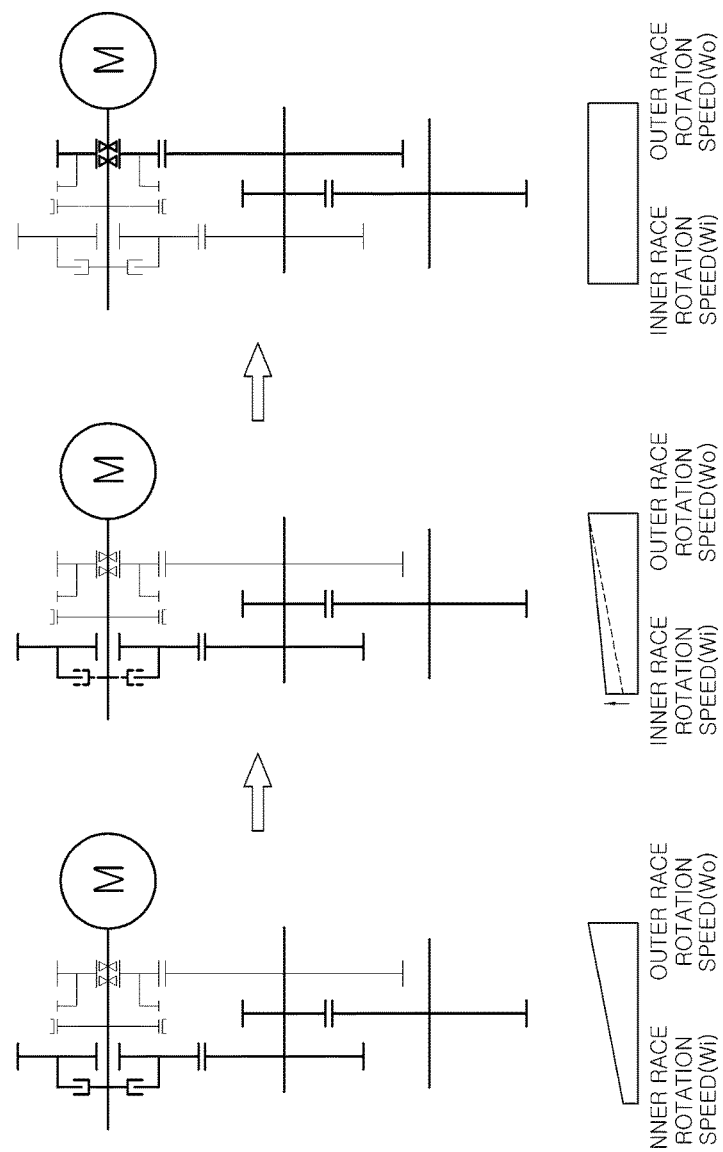
FIG. 6 is a view exemplarily illustrating a process in which the power train of the various exemplary embodiments shifts from the second gear to the first gear.

FIG. 6 illustrates a process of shifting from the second gear to the first gear. When the friction clutch CL is gradually released from the second-gear state as illustrated in the left of the FIG. 6, a speed of the internal race of the one-way clutch OWC increases and the speed of the input shaft IN and the motor M increases accordingly as illustrated in the center portion of FIG. 6. As illustrated in the right of the FIG. 6, the friction clutch CL is completely released and the power of the motor M is transmitted to the output shaft OUT only through the first driving gear 1D and the first driven gear 1P via the one-way clutch OWC, entering the first-gear state.

At the time of shifting from the second gear to the first gear as well, the gear shifting may be performed smoothly without torque interruption by gradually releasing the friction clutch CL, and it is not required to perform active control for transmitting the power of the input shaft IN to the first driving gear 1D, thus facilitating the control and facilitating the smooth gear shifting.

Figure 7:
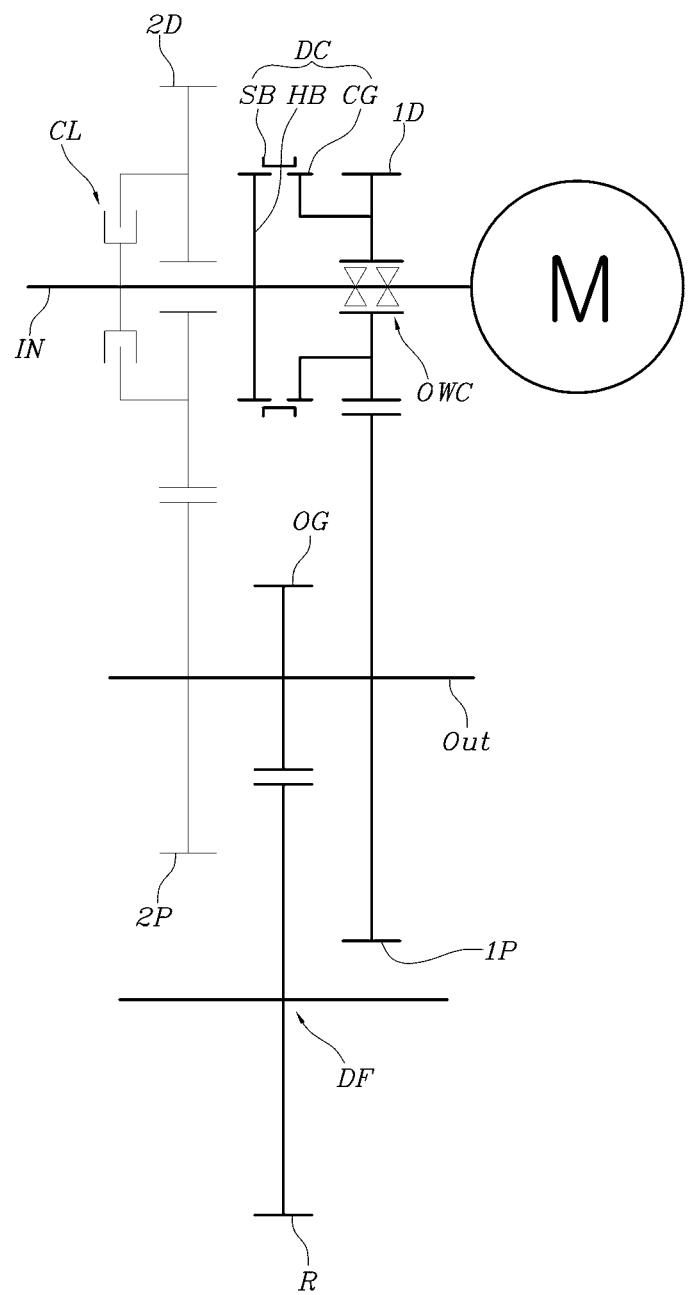
FIG. 7 is a view exemplarily illustrating a state in which the first gear is implemented by a dog clutch in the various exemplary embodiments.

Here, the first-gear state of the power train is implemented even when the dog clutch DC is engaged as illustrated in FIG. 7. In the instant state, regenerative braking may be implemented, and a reverse gear may easily be implemented by reversely rotating the motor M.

That is, the first-gear state where the dog clutch DC is released and the power of the input shaft is transmitted to the first driving gear via the one-way clutch OWC is required to easily and smoothly perform shifting from the first gear to the second gear, and the first-gear state where the dog clutch DC is engaged and the one-way clutch OWC is restrained from freely rotating is required for reverse driving or regenerative braking.

Meanwhile, FIG. 8 illustrates that a parking function is implemented in the various exemplary embodiments.

That is, since the friction clutch CL is a normally-closed type friction clutch, when the power train is implemented in the first gear in a state where the dog clutch DC is engaged and then the operating force applied to the clutch CL is released so that a vehicle may enter into a parking state, the friction clutch CL is engaged, and accordingly, the input shaft IN and the output shaft OUT are directly connected to each other at two different gear ratios to establish an interlocked state as illustrated in the left of FIG. 8, achieving the parking state in which the output shaft OUT is prevented from rotating.

Conventionally, the parking state is implemented by tooth-engaging a parking sprag as a parking mechanism, resulting in a problem in that a noise or an impact occurs. In contrast, when the parking state is implemented by releasing the operating force of the normally-closed type friction clutch CL in the first-gear state based on the dog clutch DC as in various exemplary embodiments of the present invention, it is possible to smoothly switch to the parking state without any noise or impact.

Of course, to release the parking state and drive the vehicle, the friction clutch CL may be opened to switch to the first-gear state as illustrated in the right of FIG. 8, and then the motor M may be driven to drive the vehicle in the first gear.

According to various exemplary embodiments of the present invention, it is possible to provide two gear-shift ratios with a relatively simple configuration, reduce a volume of a motor used and a weight of the vehicle depending thereon, change an operating point of the motor, and enter a neutral state in which the motor is disconnected from a driving wheel, so that fuel efficiency of the vehicle may be improved.

Furthermore, the parking function may be implemented by an interlock without having a separate parking mechanism, reducing the number of portions and contributing to a reduction in vehicle weight.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power train apparatus for a vehicle, the power train apparatus comprising:
    an input shaft to which a motor is fixedly connected;
    an output shaft mounted in parallel to the input shaft;
    a first driving gear and a first driven gear mounted on the input shaft and the output shaft, respectively, to be gear-engaged with each other;
    a second driving gear and a second driven gear mounted on the input shaft and the output shaft, respectively, to be gear-engaged with each other;
    a one-way clutch mounted in a first path where power is transmitted from the input shaft to the output shaft through the first driving gear and the first driven gear;
    a restraining mechanism mounted to selectively restrain a relative rotation between two parts connected by the one-way clutch; and
    a clutch mounted to regulate a second path where power is transmitted from the input shaft to the output shaft through the second driving gear and the second driven gear,
    wherein the restraining mechanism includes a dog clutch provided to switch between a free rotation-restrained state and a free rotation-released state of the one-way clutch by linear movement of a sleeve along an axial direction of the input shaft or the output shaft,
    wherein the first driving gear is rotatably mounted on the input shaft,
    wherein the first driven gear is fixedly mounted on the output shaft, and
    wherein the one-way clutch is mounted between the first driving gear and the input shaft to transmit power from the input shaft toward the first driving gear.

2. The power train apparatus of claim 1, wherein the dog clutch includes a hub fixedly mounted on the input shaft, a clutch gear integrally provided on the first driving gear, and the sleeve configured to be slidable linearly along the axial direction on the hub.

3. The power train apparatus of claim 1,
    wherein the second driving gear is rotatably mounted on the input shaft;
    wherein the second driven gear is fixedly mounted on the output shaft; and
    wherein the clutch is provided between the second driving gear and the input shaft to selectively connect the second driving gear to the input shaft.

4. The power train apparatus of claim 1,
    wherein the second driving gear is fixedly mounted on the input shaft;
    wherein the second driven gear is rotatably mounted on the output shaft; and
    wherein the clutch is provided between the second driven gear and the output shaft to selectively connect the second driven gear to the output shaft.

5. A power train apparatus for a vehicle, the power train apparatus comprising:
    an input shaft to which a motor is fixedly connected;
    an output shaft mounted in parallel to the input shaft;
    a first driving gear and a first driven gear mounted on the input shaft and the output shaft, respectively, to be gear-engaged with each other;
    a second driving gear and a second driven gear mounted on the input shaft and the output shaft, respectively, to be gear-engaged with each other;
    a one-way clutch mounted in a first path where power is transmitted from the input shaft to the output shaft through the first driving gear and the first driven gear;
    a restraining mechanism mounted to selectively restrain a relative rotation between two parts connected by the one-way clutch; and
    a clutch mounted to regulate a second path where power is transmitted from the input shaft to the output shaft through the second driving gear and the second driven gear,
    wherein the restraining mechanism includes a dog clutch provided to switch between a free rotation-restrained state and a free rotation-released state of the one-way clutch by linear movement of a sleeve along an axial direction of the input shaft or the output shaft,
    wherein the first driving gear is fixedly mounted on the input shaft,
    wherein the first driven gear is rotatably mounted on the output shaft,
    wherein the one-way clutch is mounted between the first driven gear and the output shaft to transmit power from the first driven gear to the output shaft,
    wherein the second driving gear is rotatably mounted on the input shaft,
    wherein the second driven gear is fixedly mounted on the output shaft, and
    wherein the clutch is provided between the second driving gear and the input shaft to selectively connect the second driving gear to the input shaft.

6. The power train apparatus of claim 5, wherein the dog clutch includes a hub fixedly mounted on the output shaft, a clutch gear integrally provided on the first driven gear, and the sleeve configured to be slidable linearly along the axial direction on the hub.

7. The power train apparatus of claim 1,
    wherein the output shaft includes an output gear; and wherein the output gear is gear-engaged to a ring gear of differential gearing to output power to the ring gear of the differential gearing.

8. The power train apparatus of claim 1, wherein the clutch is a normally-closed type clutch that transmits power in a closed state unless a separate operating force is applied thereto.

\* \* \* \* \*